Patented May 26, 1942

2,284,585

UNITED STATES PATENT OFFICE 2,284,585

PIGMENT TREATMENT

Ray L. McCleary, Richardson Park, Del., assignor to E. I. du Pont de Nemours & Company, Wilmington, Del., a corporation of Delaware No Drawing. Application May 2, 1940, Serial No. 332,990

17 Claims. (Cl. 106—300)

This invention relates to a process for producing improved pigments containing calcium compounds. More particularly it relates to a process for producing composite pigments containing calcium sulfate. Still more particularly it relates to composite pigments containing titanium dioxide and calcium sulfate.

The preparation of pigments containing calcium compounds, particularly calcium sulfate, is well-known to those versed in the art. One of the common methods is to prepare calcium sulfate, either as anhydrite or as gypsum and suspend it in a solution of titanium, hydrolyze the titanium thereby precipitating titanium dioxide in a hydrated form in close association with the calcium sulfate after which the resulting product is washed and then calcined. Another prior art process comprises preparing a fine calcium sulfate by precipitation from lime and sulfuric acid, washing, blending with a previously calcined titanium dioxide pigment, making pH adjustments, and thereafter calcining the resulting product.

Of all the common white pigments, those containing calcium sulfate have the greatest degree of water sensitivity. This substance is slightly water-soluble and it is well-known that calcium ion has a strong flocculating action on aqueous suspensions. At the same time the surface of the calcium sulfate is strongly hydrophilic. These facts probably account for the behavior of paints containing calcium sulfate when water is added to them. In some cases the addition of one cubic centimeter of water to a pint of such a paint causes the system to become a pasty almost solid mass. Even the presence of humid air will hinder paint grinding and mixing operations due to this excessive bodying. The mechanism of this effect is not well understood, but probably it is due to a flocculation of the pigment in the system with the resulting puffy frequently gel-like consistency.

The thickening of paints containing a calcium compound, particularly calcium sulfate, when water is added as heretofore made it practically impossible to use such pigments in the popular water containing paints. This phenomenon is usually referred to as water sensitivity and it is especially troublesome in the case of calcium sulfate containing pigments having a high water absorption. Another characteristic of this type of pigment is the relative difficulty with which the pigment is mixed with an oil vehicle. It is not readily wet by the liquid and considerable power and time is consumed in the mixing operation.

This invention has as an object a process for the production of an improved pigment. A further object is the preparation of composite pigments, composed of prime pigments extended with calcium compounds, said composite pigments having improved properties of mixing, consistency, hiding power, oil absorption, and when incorporated in paints will exhibit excellent brushing qualities and unique low water sensitivity. A still further object is the treatment of pigments comprising a calcium compound, particularly calcium sulfate, so as to increase the ease with which they may be incorporated in vehicles and in order to reduce the water sensitivity of the resulting paint. A still further object is the treatment of pigments comprising calcium sulfate so as to decrease the water sensitivity and improve the leveling, resistance to yellowing, and gloss of paints made from said pigments. Additional objects will become apparent from an examination of the following description and claims.

These objects are obtained according to the herein described invention which broadly comprises suspending uncalcined calcium sulfate in a solution of a compound adapted to give, by reaction with calcium sulfate, a calcium compound less soluble than calcium sulfate, and subsequently calcining the pigment.

In a more restricted embodiment of this invention a suspension of uncalcined calcium sulfate possessing the structure of insoluble anhydrite is treated with a soluble phosphate. The resulting treated calcium sulfate is then calcined to further develop its pigment properties. In this way one is able to obtain a calcium sulfate intimately associated with a minor amount of a more insoluble calcium compound which is thought to adhere or remain in intimate association with the said calcium sulfate. It is believed that in this operation the surface of the calcium sulfate is transformed and altered by replacement of a part of the calcium sulfate with another calcium compound, as, for example, calcium phosphate when the treating solution contains a soluble phosphate. This alteration of the chemical nature of the calcium extender or pigment useful substance is believed to account for the change in the pigment characteristics of the calcium sulfate pigment material.

A preferred embodiment of this invention comprises treating an aqueous suspension comprising uncalcined insoluble anhydrite and calcined titanium dioxide with a soluble phosphate, preferably an ammonium phosphate. The suspension is agitated for a short period to insure thorough incorporation of the ingredients and uniformity of the product and the pH is then adjusted to between about 7 and about 10. The resulting pigment is then dewatered, calcined, and ground for use as a pigment.

A preferred method of carrying out this invention comprises the preparation of a substantially acid-free anhydrite calcium sulfate suspension by a process well-known in the art, such as by the interaction of a lime slurry with relatively strong sulfuric acid, filtering and washing the resulting calcium sulfate, blending this calcium sulfate with calcined titanium dioxide in the proportions usually found in calcium base titanium pigments (30% TiO$_2$—70% CaSO$_4$), and adding a solution of diammonium phosphate in an amount chemically equivalent to between about 0.5% and about 2% of the calcium sulfate present in the pigment. After the addition of the phosphate if the slurry is somewhat acidic it may be neutralized by the addition of agents well-known in the art and the alkalinity of the slurry adjusted to a pH between about 7 and about 10. The resulting pigment suspension is then dewatered, calcined, and ground for use in paints, paper, shoe finishes, etc.

The manner in which the agent is added is not limited to the procedure described above in connection with the addition of the phosphate. Thus, it may be added to a titanium dioxide slurry before the addition of the uncalcined calcium sulfate or it may be added to the uncalcined calcium sulfate prior to the addition of the calcium sulfate with the titanium dioxide pigment. Further, the pigment in the dry state may also be treated with the agents such as by spraying followed by micro-pulverizing which method gives a thorough mixing of the pigment and agent. One very effective way of applying this treatment to the uncalcined calcium sulfate containing pigment is to add the agent to the aqueous suspension and then add an alkaline substance such as ammonia, lime, sodium hydroxide, and the like, until the pH of the solution reaches some value at which the insoluble calcium compound is precipitated at a pH between about 7 and about 10.

During the treatment of the anhydrite with the soluble phosphate, a double decomposition reaction is believed to take place and there is an exchange of sulfate ions for phosphate ions. This reaction takes place readily under substantially neutral conditions and for this reason it is desirable to have the slurry quite low in acid and preferably on the alkaline side. In any event, however, the treated slurry should be adjusted for pH values and this is especially desirable when the slurry remains acidic after the treatment. Also, it is preferred to employ a salt rather than an acid, such as phosphoric acid, for the treatment.

This invention may be more readily understood from an examination of the following examples which are given for illustrative purposes and are not intended to place any restrictions or limitations on the herein described invention.

Example I

Calcium sulfate in the form of insoluble anhydrite is produced by the addition of a thick lime slurry to 78% sulfuric acid by a process well-known in the art. The resultant precipitate is a finely divided anhydrous calcium sulfate and possesses excellent potential pigment properties. This anhydrite suspension is freed from residual sulfuric acid remaining from the substantial neutralization by filtration and washing operations after which it is placed in aqueous suspension and treated with a diammonium phosphate solution chemically equivalent to 1% of the calcium sulfate. The resulting suspension is then blended with a finely ground titanium dioxide in aqueous suspension in the proportions of 30 parts of titanium dioxide to 70 parts of calcium sulfate. The resulting mixture is then filtered and calcined at a temperature of about 600° C. The calciner discharge is dry ground in the usual way and packaged for use.

Example II

The operations of Example I were duplicated except that the blending of the calcined TiO$_2$ with the calcium sulfate is had before the treatment with the inorganic compound. In this instance, disodium phosphate, chemically equivalent to .75 part per 100 parts calcium sulfate was used. After thorough mixing to insure uniformity the suspension was filtered, dewatered, and calcined at about 600° C.

Example III

Calcium sulfate in the form of insoluble anhydrite was precipitated by the slow addition of a thick lime slurry to 60° Bé. sulfuric acid by the process described in U. S. Patent 2,151,339. The resulting anhydrite was filtered and washed to remove residual sulfuric acid and then suspended in a minimum amount of water. Diammonium phosphate was added to the calcium sulfate suspension and after thorough incorporation the pulp was filtered, dried, and calcined. The amount of diammonium phosphate used was chemically equivalent to 1% of the calcium sulfate in the pigment. The calcined calcium sulfate was suitable for use in paints either alone or after dry blending with other prime pigments such as zinc sulfide, titanium dioxide or the various titanates.

It is to be understood that the herein specific embodiments of this invention may be subjected to modification and variation without departing from the scope thereof. Thus, while the preferred application of this invention is in the field of calcium base titanium pigments it is understood that it is not limited thereto since it applies also in the preparation of other calcium sulfate containing pigment materials. As shown in Example III, the resulting calcum sulfate when treated and calcined alone may be blended with other prime pigments such as zinc sulfide, calcium titanate, barium titanate, zinc titanate, lead titanate, and the like. The calcium sulfate may also be used alone for incorporating into paints as filler material. As such, its pigment properties are superior to those of prior art calcium sulfate available to the paint manufacturer.

The ammonium phosphates, particularly diammonium phosphate, are especially suitable for use in the practice of this invention. This is believed to be due to the fact that ammonium salts when left in the resulting pigment have less objectionable properties than other soluble compounds such as sodium and potassium. The ammonium phosphate reacts to give calcium phosphate and ammonium sulfate. In the dewatering step subsequent to the treatment a large portion of this ammonium sulfate is removed as a filtrate. Ammonium sulfate also has the property of being volatile at calcination temperatures and this is a definite essential. However, although the ammonium phosphates are preferred it is to be understood that this invention is not limited thereto since other phosphates may be substituted therefor. Thus, organic phosphates such as glyceryl phosphate, tricresyl phosphate, and the like, as well as inorganic phosphates such as the metaphosphates and pyrophosphates may be employed. When employing sodium and potassium phosphates, more care should be exercised in removing the resulting sodium and potassium sulfates which result from the double decomposition with the treating agent.

Although it is preferred to use an amount of treating agent chemically equivalent to between about 0.5% and about 2% of the calcium sulfate to be treated, it is to be understood that amounts outside of this range may be advantageously employed. Thus, definite advantages are obtained by using an amount as low as about 0.1% or as high as about 5%. Amounts greater than about 5% are not advised since they are not justified by the enhancement of the pigment properties. Also, if an amount less than about 0.1% is employed the pigment properties are definitely inferior to those which are obtained by operating within the specified range.

The treating agents employed herein are characterized by yielding insoluble calcium compounds when placed in solutions or suspensions containing calcium ions. Calcium phosphate, for example, is known to be less soluble than calcium sulfate under substantially neutral conditions and use is made of this fact in the practice of this invention. It is evident that the solubility product of the resulting calcium salt should be lower than that of calcium sulfate.

It is quite natural that the advantages of my process are more readily found in the manufacture of calcium base titanium pigments and it is in this field that calcium sulfate has found its place in the pigment industry. Two definite methods have been proposed for the manufacture of these calcium sulfate containing pigments, the one being separate precipitation of the two components of the pigment and blending then prior to a final calcination as outlined above. Calcium base pigments have also been made by hydrolyzing the titanium dioxide from titanium salt solutions in the presence of the calcium sulfate extender thereby producing the so-called coalesced titanium pigments. My process may be used for the treatment of either type of calcium sulfate pigments and the treatment is practiced just prior to the final calcination operation.

My process also has advantages in the treatment of calcium base pigments which may be in the form of gypsum prior to the final finishing operation to obtain calcium sulfate of the anhydrite modification. The process works equally well in both instances and it is immaterial as to the state of hydration of the calcium sulfate at the time of the treatment.

Calcium sulfate pigments treated in the manner described above are found to be much less water sensitive than the untreated calcium sulfate. This is especially important when pigments are being mixed and ground into oil paints under conditions of high humidity such as prevails in the summer and it is still more important when the paint manufacturer resorts to the addition of small amounts of water to oil paints to produce thickening. By controlling the amount of the treatment disclosed above one is able to control in a large measure the water sensitivity of the pigment and thereby produces for the paint manufacturer the amount of water sensitivity desired by him.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. In a process for producing an improved pigment the steps which comprise suspending a pigment comprising uncalcined calcium sulfate in a solution of a soluble phosphate, the amount of soluble phosphate employed being chemically equivalent to between about 0.1% and about 5% of the calcium sulfate present in the pigment, adjusting the pH of the slurry to between about 7 and about 10, dewatering the pigment slurry and thereafter calcining the resulting pigment.

2. In a process for the production of an improved pigment the steps which comprise suspending a pigment comprising uncalcined calcium sulfate and calcined titanium dioxide in a solution of a soluble phosphate, the amount of soluble phosphate employed being chemically equivalent to between about 0.1% and about 5% of the calcium sulfate present in the pigment, adjusting the pH of the slurry to between about 7 and about 10, dewatering the pigment slurry and thereafter calcining the resulting pigment.

3. In a process for producing an improved pigment the steps which comprise suspending a pigment comprising uncalcined calcium sulfate in a solution of a soluble ammonium phosphate, the amount of soluble ammonium phosphate employed being chemically equivalent to between about 0.1% and about 5% of the calcium sulfate present in the pigment, adjusting the pH of the slurry to between about 7 and about 10, dewatering the pigment slurry and thereafter calcining the resulting pigment.

4. In a process for the production of an improved pigment the steps which comprise suspending a pigment comprising uncalcined calcium sulfate and calcined titanium dioxide in a solution of a soluble ammonium phosphate, the amount of soluble ammonium phosphate employed being chemically equivalent to between about 0.1% and about 5% of the calcium sulfate present in the pigment, adjusting the pH of the slurry to between about 7 and about 10, dewatering the pigment slurry and thereafter calcining the resulting pigment.

5. In a process for the production of an improved pigment the steps which comprise suspending a pigment comprising uncalcined calcium sulfate and calcined titanium dioxide in a solution of diammonium phosphate, the amount of diammonium phosphate employed being chemically equivalent to between about 0.1% and about 5% of the calcium sulfate present in the pigment, adjusting the pH of the slurry to between about 7 and about 10 and thereafter dewatering and calcining the resulting pigment.

6. A calcium sulfate pigment comprising a pigment and a calcined calcium sulfate base and having a calcium phosphate coating on the pigment particles thereof, said calcium phosphate being in the calcined condition.

7. A calcium sulfate pigment comprising calcined calcium sulfate and calcined titanium dioxide, the particles of said pigment having a coating of calcined calcium phosphate.

8. A calcium sulfate pigment comprising calcined calcium sulfate and calcined titanium dioxide, the particles of said pigment having a coating of calcined calcium phosphate in an amount chemically equivalent to between about 0.1% and about 5% of the calcium sulfate present in the pigment.

9. In a process for the production of an improved pigment the steps which comprise suspending a pigment comprising uncalcined calcium sulfate and calcined titanium dioxide in a solution of diammonium phosphate, the amount of diammonium phosphate employed being chemically equivalent to between about 0.5% and about 2% of the calcium sulfate present in the pigment, adjusting the pH of the slurry to between about 7 and about 10 and thereafter dewatering and calcining the resulting pigment.

10. A calcium sulfate pigment comprising a calcined composite calcium sulfate titanium pigment having a calcium phosphate coating on the pigment particles thereof, said calcium phosphate being in the calcined condition.

11. A calcium sulfate pigment comprising a calcined composite calcium sulfate titanium pigment, the particles of said pigment having a coating of calcined calcium phosphate.

12. In a process for producing an improved pigment the steps which comprise suspending a pigment comprising uncalcined calcium sulfate in a solution of a soluble phosphate, thereby intimately associating with the calcium sulfate a minor amount of calcium phosphate, and thereafter calcining the pigment.

13. In a process for the production of an improved pigment the steps which comprise suspending a pigment comprising uncalcined calcium sulfate and calcined titanium dioxide in a solution of a soluble phosphate, adjusting the pH of the slurry to between about 7 and about 10 thereby intimately associating with the calcium sulfate a minor amount of calcium phosphate, and thereafter calcining the resulting pigment.

14. In a process for producing an improved pigment the steps which comprise suspending a pigment comprising uncalcined calcium sulfate and calcined zinc sulfide in a solution of a soluble phosphate, the amount of soluble phosphate employed being chemically equivalent to between about 0.1% and about 5% of the calcium sulfate present in the pigment, adjusting the pH of the slurry to between about 7 and about 10, dewatering the pigment slurry, and thereafter calcining the resulting pigment.

15. In a process for the production of an improved pigment the steps which comprise suspending a pigment comprising uncalcined calcium sulfate and calcined zinc sulfide in a solution of a soluble ammonium phosphate, the amount of soluble ammonium phosphate employed being chemically equivalent to between about 0.1% and about 5% of the calcium sulfate present in the pigment, adjusting the pH of the slurry to between about 7 and about 10, dewatering the pigment slurry and thereafter calcining the resulting pigment.

16. A calcium sulfate pigment comprising calcined calcium sulfate and calcined zinc sulfide, the particles of said pigment having a coating of calcined calcium phosphate.

17. A calcium sulfate pigment comprising calcined calcium sulphate and calcined zinc sulfide, the particles of said pigment having a coating of calcined calcium phosphate in an amount chemically equivalent to between 0.1% and about 5% of the calcium sulfate present in the pigment.

RAY L. McCLEARY.

CERTIFICATE OF CORRECTION.

Patent No. 2,284,585. May 26, 1942.

RAY L. McCLEARY.

It is hereby certified that error appears in the printed specification of the above numbered patent requiring correction as follows: Page 3, second column, line 72, claim 6, before the word "pigment" insert --prime--; and that the said Letters Patent should be read with this correction therein that the same may conform to the record of the case in the Patent Office.

Signed and sealed this 28th day of July, A. D. 1942.

(Seal)

Henry Van Arsdale,
Acting Commissioner of Patents.